Figure 3:
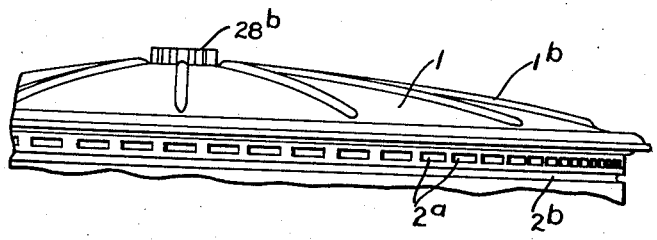

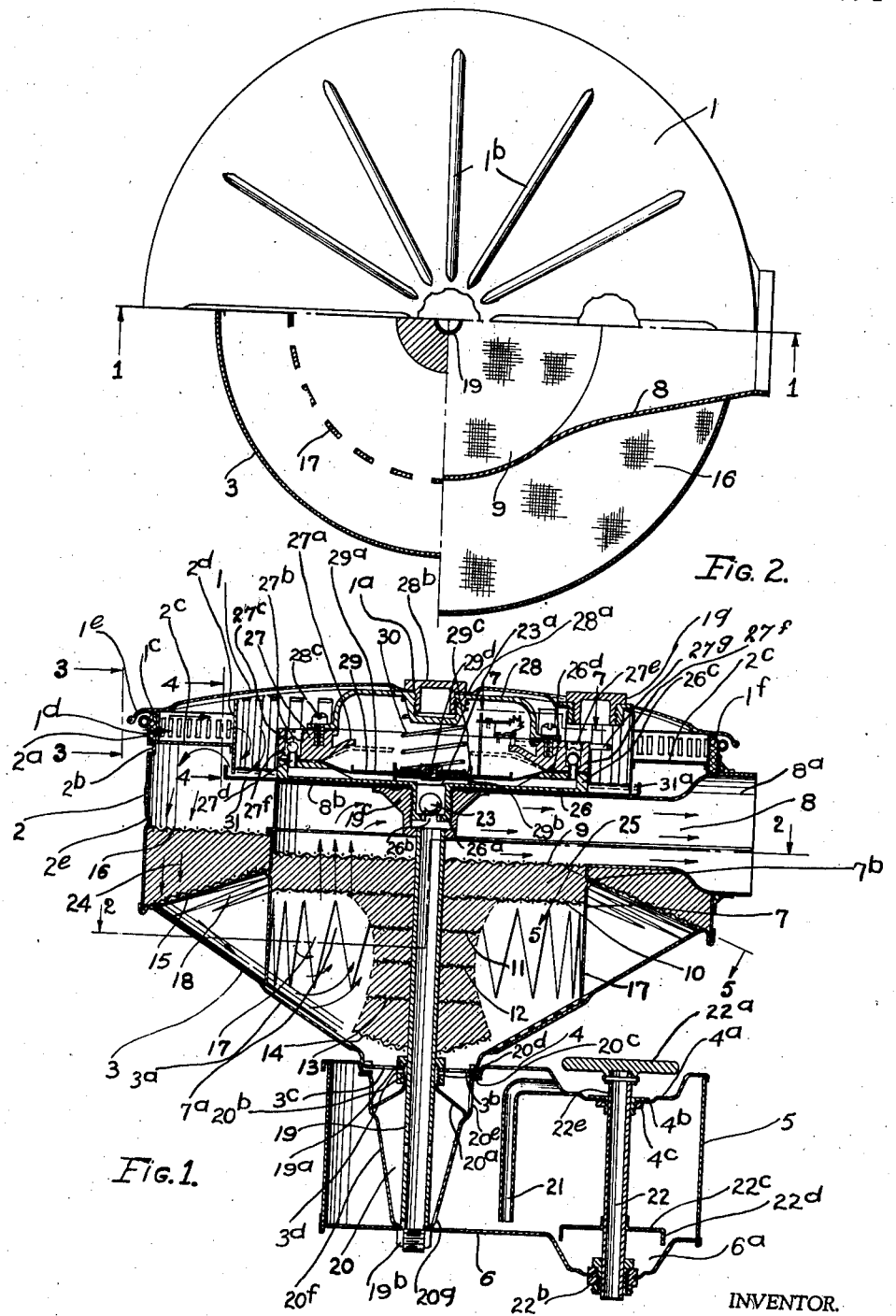

July 22, 1941.  C. W. HAGAR  2,249,822
AIR CLEANER
Filed June 28, 1938  2 Sheets-Sheet 2

INVENTOR.
Carl W. Hagar
BY A.B.Bowman
ATTORNEY.

Patented July 22, 1941

2,249,822

UNITED STATES PATENT OFFICE 2,249,822

AIR CLEANER

Carl W. Hagar, San Diego, Calif., assignor to Aeromotive Components Corporation, San Diego, Calif., a corporation of California Application June 28, 1938, Serial No. 216,260

3 Claims. (Cl. 183—8)

My invention relates to air cleaners for separating and cleaning dust particles from the air for use in connection with internal combustion engines or for other air conditioning purposes where deleterious matter is to be separated and removed from the air and the objects of my invention are:

First, to provide an air cleaner of this class in which a liquid cleaning fluid for collecting purposes is circulated through the cleaner in such a manner as to contact the air stream and the dust in the air is scattered by the cleaner and separated from the air;

Second, to provide an air cleaner of this class which provides a complete intermingling of the air with the cleaner fluid in its passage through the cleaner;

Third, to provide an air cleaner of this class in which there is a complete scrubbing action of the air with the fluid cleaning means;

Fourth, to provide an air cleaner of this class in which there is provided separating means that deflects the air ladened with dust into contact relation with a cleaning fluid which absorbs the dust and separates it from the air and the air is conducted in a separate channel from the dust ladened fluid after separation;

Fifth, to provide a fluid cleaner of this class with fluid and air directing and separating means whereby both fluid and air are directed in their proper relation to each other for a maximum of cleaning;

Sixth, to provide a cleaner of this class which not only cleans the air of deleterious matter but also cleans the cleaning fluid and returns it for further use;

Seventh, to provide a cleaner of this class wherein the dust particles are enveloped by liquid and then caused to settle entirely free and separate from the air stream so that once the dust particles or other deleterious matter are separated from the air they cannot be returned to the air stream even though the cleaner should become inoperative and air be caused to flow therethrough without being cleaned;

Eighth, to provide a cleaner of this class wherein the resistance of the air flow is minimized and remains at a minimum even though operated for a long period of time, deleterious matter being removed as fast as it is collected so that it in no manner forms obstructions in the air flow;

Ninth, to provide an air cleaner of this class which cools the cleaning liquid as well as cleans the air thereby operating both as an air cleaner and a liquid cooler;

Tenth, to provide an air cleaner of this class which operates efficiently throughout a wide range of flow pressure; and Eleventh, to provide a novelly constructed cleaner of this class which is particularly efficient in action even under extreme adverse conditions, sturdy and compact and which will not readily deteriorate and get out of order.

Figure 4:
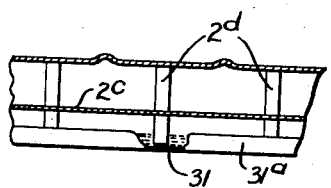
Figure 5:
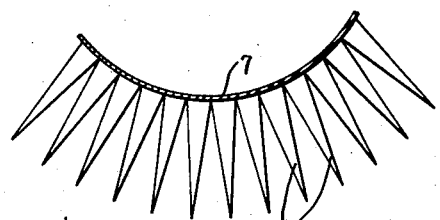
Figure 6:
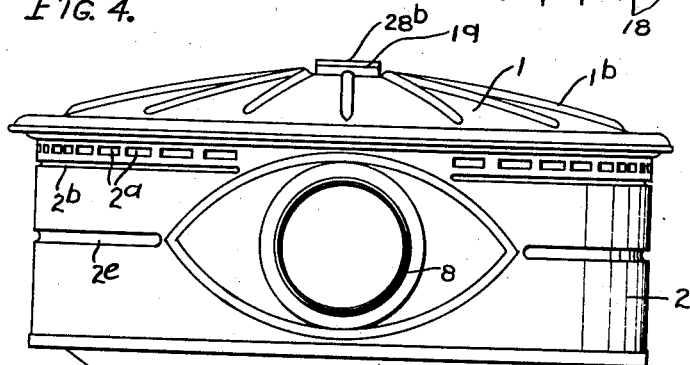
Figure 7:
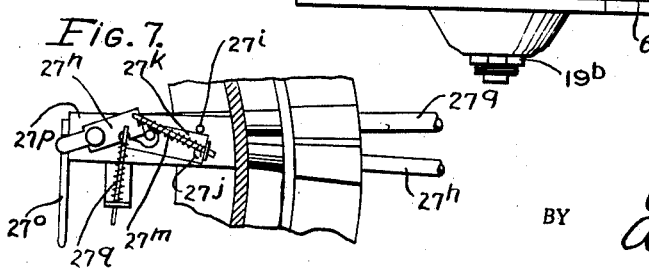

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is a sectional view of my air cleaner taken from the line 1—1 of Fig. 2 and showing some of the parts and portions in elevation to facilitate the illustration; Fig. 2 is a partial top or plan and partial sectional view from the top side, the section taken from the line 2—2 of Fig. 1; Fig. 3 is a fragmentary side elevational view of the upper portion of my air cleaner; Fig. 4 is a fragmentary sectional view taken from the line 4—4 of Fig. 1; Fig. 5 is a fragmentary sectional view taken from the line 5—5 of Fig. 1; Fig. 6 is a side elevational view of my cleaner taken at right angles from that of Fig. 1 of the drawings, and Fig. 7 is an enlarged sectional view taken from line 7—7 of Fig. 1.

Similar characters of reference refer to similar parts and portions throughout the several views of the drawings.

The main outer casing members 1, 2, and 3; sump casing members 4, 5, and 6; cylindrical partition 7, air outlet casing 8, screens 9 to 16 inclusive; finger groups 17 and 18, cleaner fluid return tube 19; fluid chamber 20; fluid outlet overflow tube 21; fluid drain tube 22; check valve 23, separating or contact mass means 24 and 25; pump casing members 26, 27, and 28, pump diaphragm 29; and pump spring 30 constitute the principal parts of my air cleaner.

The casing member 1 is the top or cover casing member for the air cleaner. It is preferably made of sheet metal and is provided with a central opening 1a. It is provided with raised rib portions 1b for reinforcing purposes radiating from the central portion as shown best in Figs. 1 and 2 of the drawings. Near its periphery is provided an annular downwardly extending flange 1c which is provided with a series of slots 1d for the admission of air to the cleaner. It is also provided with an overhanging portion 1e which extends outwardly from said flange 1c. Positioned below this portion 1e of the casing member 1 in spaced relation therefrom is the upper edge of the main casing member 2 which is rolled as shown best in Fig. 1 of the drawings. It is positioned in spaced relation from the member 1c as shown best in Fig. 1 of the drawings and between this upper edge and the member 1c there is provided a primary filter member 1f which is adapted to remove the heavy particles of dust and other matter from the air in its passage into the cleaner. Just below the upper edge of the member 2 which is a cylindrical member is provided a plurality of slots 2a for the admission of air to the filter member 1f. It will also be noted that air may pass between the member 1e and the upper edge of the member 2 through the filter and into the air cleaner. Just below the series of slots 2a there is provided a series of reinforcing grooves 2b above which is secured a partition 2c, and secured to the inner edge of this partition 2c is a plurality of strips 2d which extend downwardly past a partition 2c some distance as shown best in Fig. 1 of the drawings and extend into a liquid trough 31 which is provided with an upwardly extending flange 31a providing a trough for the cleaning liquid, it being noted that the air passes over the surface of this cleaning liquid as shown by arrows in Fig. 1 of the drawings. This casing member 2 is also composed of sheet metal and provided near its middle wtih indentations 2e for reinforcing purposes. Secured to the lower edge of this member 2 is the upper edge of the casing member 3 which is also composed preferably of sheet metal and is inverted frusto-conical in shape as shown best in Figs. 1 and 6 of the drawings. It is provided with integral rib portions 3a as shown best in Figs. 1 and 6 of the drawings for reenforcing purposes. It is provided centrally at its lower side with a downwardly extending portion 3b which is provided with a series of perforations 3c to permit the passage of dust ladened liquid therethrough. Mounted centrally in the portion 3b is the cleaner fluid return tube 19 which extends upwardly some distance therefrom and downwardly some distance therefrom. This tube is connected to the portion 3b by means of a collar 19a on the tube 19 secured against a gasket 3d which rests against the member 3b and secured around this tube 19 is a partition member 20a which is frusto-conical in shape provided with a screw threaded portion 20b over which is mounted a nut 20d. The outer edge of this member 20a connects with the fluid chamber 20. This fluid chamber 20 is frusto-conical in shape and is provided with a flange at its upper end 20c with perforations 20e below said flange and with other perforations 20f between the partition 20a and near the lower end with a mud outlet opening 20g all as shown best in Fig. 1 of the drawings. Connected to the flange portion 20d and interposed between the same and the portion 3b is the upper sump casing member 4 which is preferably circular in shape as shown. This cover member 4 is eccentrically connected to the portion 3b and tube 19 as shown. It is provided at one side with a well portion 4a which communicates with the fluid outlet overflow tube 21 as shown best in Fig. 1 of the drawings. Secured to the perimeter of this upper sump casing 4 is a cylindrical casing 5 and secured to the lower edge of said casing 5 is the lower sump casing 6 which is secured to the lower side of the member 20 and to the tube 19 by means of a nut 19b screw threaded on the lower threaded end of the member 19. This member 6 is provided with a well portion 6a immediately below the well 4a in the member 4 and positioned in these two wells 4a and 6a is the fluid drain tube 22 which is provided with a handle 22a on its upper end. It is secured to the casing member 4 by means of nuts 4b and 4c interlocked therewith and between which the portion 4a is interposed. It is secured to the portion 6a by means of a stuffing box 22b. Positioned on this member 22 near the top of the well 6a is a flange member 22c which is provided with a downwardly extending portion 22d leaving a small space between the member 22d and the upper side of the well 6a, all as shown best in Fig. 1 of the drawings.

Surrounding the tube 19 near its upper end and spaced considerable distance therefrom is a cylindrical partition 7. The partition 7 is provided with a series of V-shaped cutout portions 7a extending a great distance upwardly from its lower side substantially two-thirds of its heighth forming a plurality of downwardly extended pointed fingers 17 as shown best in Fig. 1 of the drawings which extend to direct the air in its passage through the cleaner downwardly to near the member 3 to provide a substantially scrubbing action along the upper surface of the beveled member 3 and extending outwardly from this partition 7 above the fingers 17 to near the upper edge of the member 3 is a plurality of fingers 18 which are secured to the other surface of the member 7 immediately above a reenforced portion 7b as shown best in Figs. 1 and 5 of the drawings. These extend outwardly on an angle and have a tendency to force the air in its passage outwardly for scrubbing the upper surface of the casing member 3 in its passage through the cleaner. This partition 7 communicates with an air outlet casing 8 which is substantially circular at its extended end 8a and gradually widens on a horizontal plane inwardly and narrows on a vertical plane and merging with the cylindrical partition 7 at its inner side as shown best in Figs. 1 and 2 of the drawings the upper side 8b closing the upper side of the partition 7 and forming a merging connection with the outlet casing 8. Mounted in the cylindrical partition 7 and surrounding the tube 19 are screens 9 and 10 and below the screen 10 is a plurality of shorter screens extending outwardly from the tube 19, which screens are designated 11, 12 and 13, and positioned below the screen 13 and extending to near the bottom of the casing member 3 is a curved screen 14 and back between these screens 9 to 14 inclusive is a separating means 25 which consists largely of a plurality of cylindrical like metallic coils or metal shavings forming deflecting surfaces for deflecting the air and cleaning fluid and separating the dirt, dust and deleterious matter from the air in its passage therethrough.

Positioned outwardly of the partition 7 and between the same and the casing member 2 is a substantially horizontal screen partition 16 and spaced therefrom and extending from the upper side of the reenforcing 7b on the partition 7 and the lower edge of the casing member 2 on an angle and just above the finger members 18 is another screen partition 15. Interposed between these screen partitions 15 and 16 is separating means 24 which is the same kind of separating means as hereinbefore described. Connecting the upper end of the tube 19 with the upper partition member 8b is a casing member 19c secured to the upper end of the tube 19 and to the partition 8b by means of outwardly extending flanges. This casing member is internally threaded adapted to receive an externally threaded hollow lug portion extending centrally from the lower side of the pump casing member 26 which is provided with a central hole 26b over which is mounted a ball check valve 23 and provided with a screen 23a over said check valve. Interposed between the partition 8b and the casing member 26 is a fluid cleaner trough 31 which extends outwardly from the casing some distance and forms an annular trough by means of the flange 31a which extends upwardly. This casing member 26 is provided with an upwardly extending flange 26c at its outer side provided with an inwardly extending portion 26d upon which is mounted the outer edge of the pump diaphragm 29 which is a flexible diaphragm. This flexible diaphragm 29 is provided with a flanged plate 29a supported on the upper side of its central portion and with a smaller flange 29b on the lower side of its central portion. The flange portion 29b is adapted to engage the upper side of the casing member 26 when the diaphragm is depressed while the flange of the plate 29a is adapted to engage the lower side of the extended portion 27a of the casing 27 when it is in raised position as shown by dotted line in Fig. 1 of the drawings. Positioned on the upper side of the plate 29a is a spring retainer flange plate 29c, and these plates 29a, 29b, and 29c are rigidly secured together by a bolt 29d. Mounted in the plate 29c is the pump spring 30 which tends to hold the diaphragm downwardly at all times. It is supported at its upper end around a lug portion 28a extending centrally downwardly from the casing member 28. This lug portion 28a is internally threaded adapted to receive a casing supporting plug member 28b which secures the casing 20 to the casing member 1 at the central portion, all as shown best in Figs. 1 and 2 of the drawings.

The casing member 28 is secured to the casing member 27 by means of bolts 28c. This casing member 27 is provided with a plurality of recesses 27b in which are mounted ball valves 27c which are seated on tubes 27d which communicate with the space between the diaphragm 29 and the upper side of the casing 26 and are adapted to receive the cleaning fluid into said recesses 27b which are closed at their upper ends by means of plugs 27e and these recesses are provided with outlet openings 27f to permit the cleaning fluid to pass from the chamber 27b into the trough 31 as shown best in Fig. 1 of the drawings.

Communicating with the interior of the casing formed by the casing members 26, 27, and 28 are vacuum tubes which are adapted to be connected with any vacuum means for causing vacuum pulsations for operating the pump and provided with a spring operated check valve for closing the connection. The vacuum tube is designated 27g, shown best in Fig. 7 of the drawings and the air inlet tube 27h. This vacuum tube 27g communicates with the interior of the casing through opening 27i and the air inlet tube 27h communicates therewith through the openings 27j which are adapted to be covered and uncovered by means of a valve member 27k. This valve member is controlled by an over center spring 27m which is connected to a lever 27n, and this lever 27 is operated by another lever 27o which is pivotally mounted on the block 27p and its extended end is adapted to engage the upper side of the plate 29a and when the diaphragm raises, this lever is operated which tends to shift the lever 27n and throws the valve 27k over the vacuum opening 27i and opens the air opening 27j which permits air to enter and permits the diaphragm to descend. In order to insure the lever 27o in its engagement with the diaphragm plate 29a an additional spring 27q is used tending to thrust the lever member 27 over and therefore the end of the lever 27o against the plate 29a and with the reciprocation of the diaphragm oil is pumped through the tube 19 past the valve 23.

The operation of my air cleaner is substantially as follows: A liquid cleaning fluid is poured into the air cleaner through the opening in which the plug 1g is positioned until the oil sump is full and oil can be seen at the top of the overflow tube 21. It will be here noted that as deleterious matter is accumulated in the oil sump, the air cleaning liquid displaced by the deleterious matter is permitted to flow out through the tube 21 into the depression 4a and passes through a hole 22e in the tube 22 and runs out at the lower end of said tube 22. The outlet casing 8 is connected with any opening through which the cleaned air is to be utilized. The interior of the pump casing is connected with a vacuum producing means and the air cleaner is ready for operation. Air passes into the cleaner between the portion 1e of the casing member 1 and the upper edge of the casing member 2 and through the openings 1d and 2a passing through the primary filtering member 1f which takes out the heavier dust particles. The air then passes as shown by arrows between the members 2d, then down over the trough 31 through between the lower ends of the members 2d, below the partition 2c, then out through the screen 16, through the multi-cylindrical metallic deflecting and separating members forming the packing 24, then through the screen 15 and the major portion of the air is deflected outwardly by engagement with the broad portions of the tapering fingers 18 causing turbulence for scrubbing the inner wall of the lower casing member 3, then is deflected downwardly against said casing member in the same way by the fingers 17 for the same purpose. These fingers 17 form a retarding means for the air whereby a lower pressure area is produced back of these finger members permitting oil particles laden with dirt to gravitate down the back side of the finger members and onto the bottom of the outer casing and downwardly therefrom into the sump casing. The cleaning fluid picks up the dust particles and passes downwardly through the openings 3c and 3b and into the sump, the sump having a predetermined quantity of cleaning fluid in the bottom thereof which is pumped upwardly through the tube 19 by passing through the openings 20f in the chamber 20 and is pumped upwardly past the valve 26a by the reciprocation of the diaphragm 29 caused by the vacuum connection therewith and operated downwardly by the spring 30. The air passes on upwardly through the screens 9 to 14 inclusive, together with the packing 25 packed therein. The dust or dirt ladened fluid cleaner dripping back down into the sump while the clean air passes outwardly through the outlet passage 8, the cleaning fluid being pumped into the trough causes it to overflow at its outer edge and drop down onto the screen 16 and passes downwardly and saturates the separating medium for collecting the dust and other deleterious matter from the air as it passes downwardly through the separating means and screen, deflected outwardly at all times by the fingers.

Though I have shown and described a particular construction, combination, and arrangement of parts and portions, I do not wish to be limited to this particular construction, combination and arrangement but desire to include in the scope of my invention the construction, combination and arrangement particularly as set forth in the appended claims.

Having thus described my invention, what I claim as new and desire to secure by Letters Patent is:

1. In an air cleaner of the class described, the combination of an annular outer casing provided with a downwardly and inwardly tapered bottom portion with a sump opening at the central lower side, an inner annular casing open at its lower side positioned therein in spaced relation with said outer casing, a contact mass positioned in the space between said outer and inner casings, downwardly and outwardly pointed tapered finger members positioned in annular rows between said inner and outer casings below said contact mass, said outer casing provided with an air inlet above said contact mass, a filter mass positioned over the sump opening in said outer casing and extending upwardly centrally of said casing and provided with a disk-like extended portion at its upper side forming a filter partition for said inner casing, an annular cleaning liquid trough positioned over said contact mass and below said air inlet in said outer casing, a sump casing communicating with the sump opening in said outer casing and extending below the same, a tube with its lower end positioned in said sump casing and extending upwardly centrally of said air cleaner, and a cleaning liquid pump connected with the upper end of said tube.

2. In an air cleaner of the class described, the combination of an annular outer casing provided with a downwardly and inwardly tapered bottom portion with a sump opening at the central lower side, an inner annular casing open at its lower side positioned therein in spaced relation with said outer casing, a contact mass positioned in the space between said outer and inner casings, downwardly and outwardly pointed tapered finger members positioned in annular rows between said inner and outer casings below said contact mass, said outer casing provided with an air inlet above said contact mass, a filter mass positioned over the sump opening in said outer casing and extending upwardly centrally of said casing and provided with a disk-like extended portion at its upper side forming a filter partition for said inner casing, an annular cleaning liquid trough positioned over said contact mass and below said air inlet in said outer casing, a sump casing communicating with the sump opening in said outer casing and extending below the same, a tube with its lower end positioned in said sump casing and extending upwardly centrally of said air cleaner, a cleaning liquid pump connected with the upper end of said tube, and means connecting said pump with said cleaning liquid trough.

3. In an air cleaner of the class described, the combination of an annular outer casing provided with a downwardly and inwardly tapered bottom portion with a sump opening at the central lower side, an inner annular casing open at its lower side positioned therein in spaced relation with said outer casing, a contact mass positioned in the space between said outer and inner casings, downwardly and outwardly pointed tapered finger members positioned in annular rows between said inner and outer casings below said contact mass, said outer casing provided with an air inlet above said contact mass, a filter mass positioned over the sump opening in said outer casing and extending upwardly centrally of said casing and provided with a disk-like extended portion at its upper side forming a filter partition for said inner casing, an annular cleaning liquid trough positioned over said contact mass and below said air inlet in said outer casing, and means below said air inlet in said outer casing for deflecting air over the liquid in said cleaning liquid trough.

CARL W. HAGAR.